United States Patent
Hao et al.

(10) Patent No.: US 8,731,291 B2
(45) Date of Patent: May 20, 2014

(54) ESTIMATING THE CLUTTER OF DIGITAL IMAGES

(71) Applicants: Wei Hao, Superior, CO (US); Alexander C. Loui, Penfield, NY (US); Cathleen D. Cerosaletti, Rochester, NY (US)

(72) Inventors: Wei Hao, Superior, CO (US); Alexander C. Loui, Penfield, NY (US); Cathleen D. Cerosaletti, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/624,985

(22) Filed: Sep. 24, 2012

(65) Prior Publication Data

US 2014/0086487 A1    Mar. 27, 2014

(51) Int. Cl.
*G06K 9/00* (2006.01)
(52) U.S. Cl.
USPC ............................................. 382/168
(58) Field of Classification Search
USPC ......... 382/168, 172, 173, 190, 208, 218–220, 382/224, 228; 700/90
See application file for complete search history.

(56) References Cited

U.S. PATENT DOCUMENTS

| | | | |
|---|---|---|---|
| 4,996,437 A * | 2/1991 | Hendrick, Jr. ............. | 250/252.1 |
| 6,081,753 A * | 6/2000 | Meitzler et al. ................. | 700/90 |
| 6,282,317 B1 | 8/2001 | Luo et al. | |
| 6,778,699 B1 | 8/2004 | Gallagher | |
| 2011/0075917 A1 | 3/2011 | Cerosaletti et al. | |

OTHER PUBLICATIONS

Rosenholtz et al., "Measuring visual clutter," Journal of Vision, vol. 7, pp. 1-22 (2007).
Dalal et al., "Histograms of oriented gradients for human detection," IEEE Computer Society Conference on Computer Vision and Pattern Recognition, vol. 1, pp. 886-893 (2005).
Pass et al., "Comparing images using color coherence vectors" (Proc. Fourth ACM International Conference on Multimedia, pp. 65-73 (1996).
Cerosaletti et al., "Investigating two features of aesthetic perception in consumer photographic images: clutter and center," Proc. SPIE 7865, Human Vision and Electronic Imaging XVI, 786507 (2011).
Jiang et al., "Automatic aesthetic value assessment in photographic images," Proc. International Conference on Multimedia and Expo, pp. 920-925 (2010).

* cited by examiner

*Primary Examiner* — Amir Alavi
(74) *Attorney, Agent, or Firm* — Kevin E. Spaulding

(57) ABSTRACT

A method for determining an estimated clutter level of an input digital image based on an inequality index. The inequality index is determined by partitioning the input digital image into small sub-images and analyzing the sub-images to determine a set of image features. The image features are associated with a set of designated reference features, and the inequality index is determined based on the statistical variation of the reference features. The inequality index is compared to a predefined threshold to classify the input digital image as a rich-content image or a low-content image. For rich-content images, the estimated clutter level is determined responsive to a set of scene content features relating to spatial structures or semantic content of the input digital image is determined by analyzing the input digital image. For low-content images, the estimated clutter level is determined responsive to an overall luminance level.

14 Claims, 10 Drawing Sheets

ESTIMATING THE CLUTTER OF DIGITAL IMAGES

CROSS-REFERENCE TO RELATED APPLICATIONS

Reference is made to commonly assigned, co-pending U.S. patent application Ser. No. 13/624,986, entitled: "Determining the estimated clutter of digital images", by Hao et al., which is incorporated herein by reference.

FIELD OF THE INVENTION

This invention pertains to the field of digital image processing, and more particularly to a method for estimating the clutter of a digital image.

BACKGROUND OF THE INVENTION

The perceived clutter of an image is a perceptual characteristic of images that represents a significant aspect of image quality in the consumer image domain. Generally, images having a higher level of perceived clutter will have a correspondingly lower level of image quality. Therefore, the ability to estimate the perceived clutter of an image is important component of being able to determine the perceived image quality.

While most people have an intuitive feel for how to visually evaluate the degree of clutter in an image, determining quantitative measures for image clutter has been a great challenge in computer vision. Previous studies have generally used low level information in an image to predict image clutter. For example, Rosenholtz et al., in an article entitled "Measuring visual clutter" (Journal of Vision, Vol. 7, pp. 1-22, 2007), have described a method for predicting image clutter which uses color, orientation, and luminance contrast as predictive features. Such approaches have had only limited success, especially in the consumer image domain.

There remains a need for a robust method for estimating the perceived clutter of consumer images.

SUMMARY OF THE INVENTION

The present invention represents a method for determining an estimated clutter level of an input digital image, the method being performed at least in part using a data processor, comprising:

designating a set of reference features;
partitioning the input image into small sub-images;
determining a set of image features by automatically analyzing the sub-images;
associating each of the determined image features with one of the reference features;
forming a frequency distribution representing a frequency of occurrence of the associated reference features for the input digital image;
analyzing the frequency distribution to determine an inequality index, the inequality index being a measure of statistical variation of the reference features;
comparing the inequality index to a predefined threshold to classify the input digital image as a rich-content image or a low-content image;
if the input digital image is classified as a rich-content image:
analyzing the input digital image to automatically determine scene content features relating to spatial structures in the input digital image or semantic content of the input digital image; and
determining the estimated clutter level responsive to the scene content features; and
if the input digital image is classified as a low-content image:
analyzing the input digital image to automatically determine an overall luminance level; and
determining the estimated clutter level responsive to the determined overall luminance level.

This invention has the advantage that the estimated image clutter is determined using a method that incorporates a higher level description of image content and more closely models human visual perception. Therefore a more accurate image clutter prediction is achieved, especially in the consumer image domain.

It has the additional advantage that the image clutter is estimated based on the amount of information in an image, and thus facilitates a deeper understanding of the composition of the image.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image", as used herein, refers to any type of digital image, such as a digital still image or a digital video image.

Figure 1:
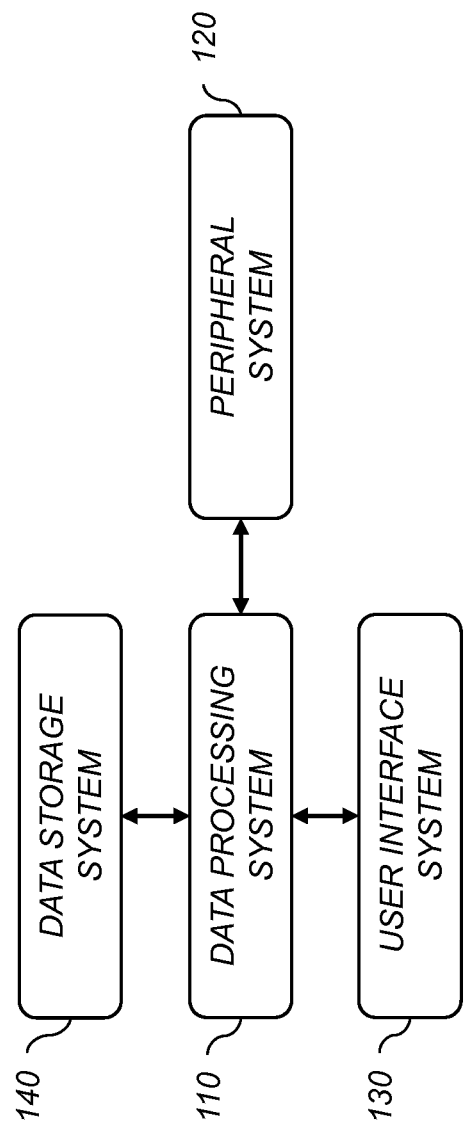
FIG. 1 is a high-level diagram showing the components of an image processing system according to an embodiment of the present invention.

FIG. 1 is a high-level diagram showing the components of an image processing system useful for embodiments of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
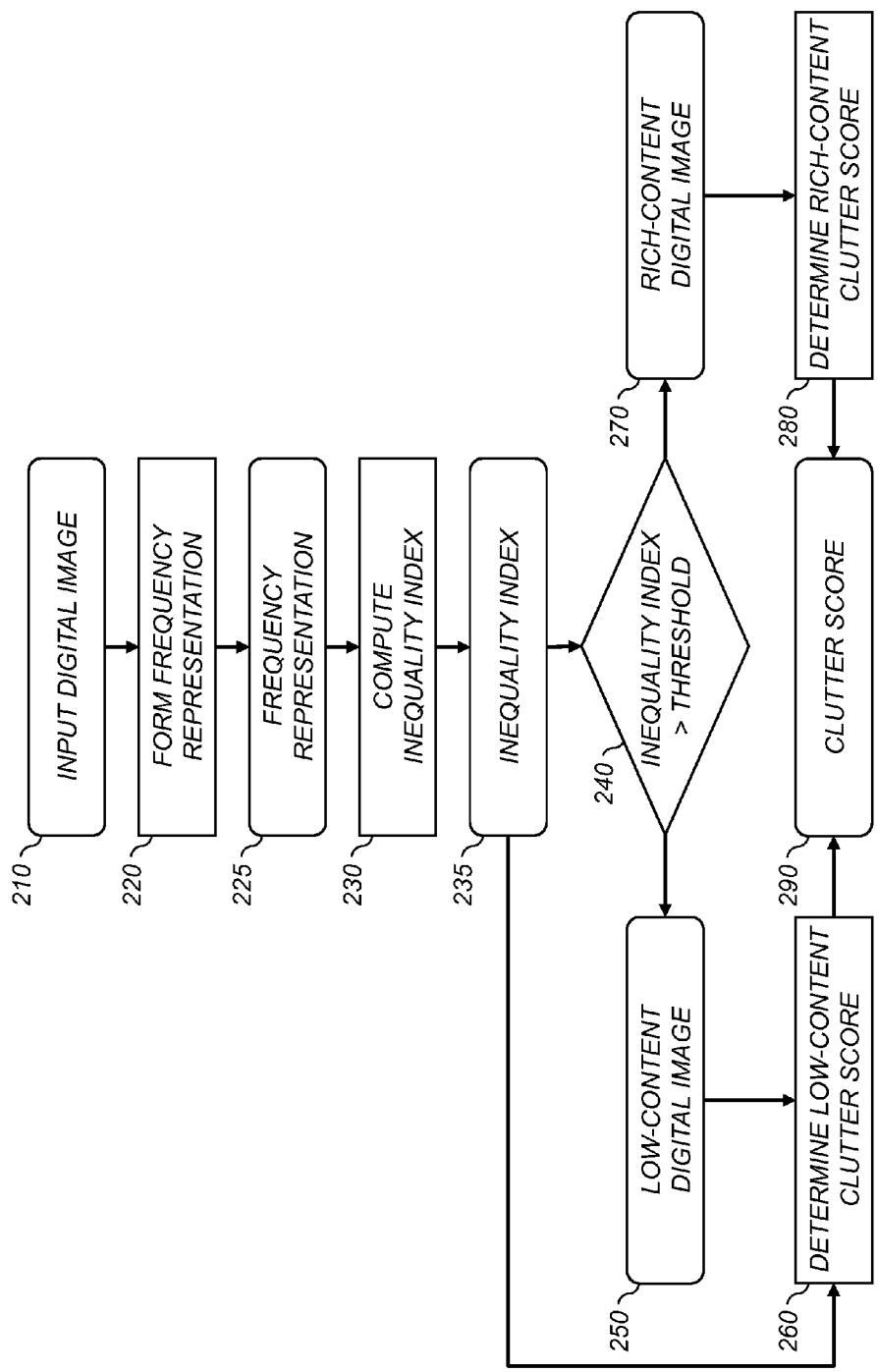
FIG. 2 is a flowchart of a method for estimating image clutter according to a preferred embodiment.

FIG. 2 is a flowchart of a method for determining a clutter score 290 in accordance with a preferred embodiment of the present invention. An input image 210 is processed using a form frequency representation step 220 to produce a frequency representation 225. The frequency representation 225 indicates the frequency of occurrence of a set of features in the input digital image 210. Additional details of the form frequency representation step 220 will be described in FIG. 3.

A compute inequality index step 230 is then used to determine an inequality index 235. The inequality index 235 is a measure of uncertainty or variation or dispersion associated with a random variable. Any appropriate measure known in the art can be used in accordance with the present invention. Two such measures are the entropy (E) and Gini coefficient (G) which are defined in the following equations:

$$E = -\sum_{k} p_k \log(p_k) \qquad (1)$$

$$G = \sum_{k} (p_k)^2 \qquad (2)$$

where $p_k$ is the probability of the $k^{th}$ reference feature. In this case, the probabilities of the set of features are specified by the frequency representation 225. The Gini coefficient is also known in the art as the Gini index.

An inequality index test 240 is used to compare the inequality index 235 to a predefined threshold, to separate low-content digital images 250 from rich-content digital images 270. Consider the case where the Gini coefficient is used for the inequality index 235. The Gini coefficient is a number between 1/K and 1, where K is number of reference features. A Gini coefficient of 1/K indicates a state of perfect equality where all values of the distribution are the same. It implies that the input digital image 210 contains all the possible reference features in equal numbers. On the other hand, a Gini coefficient of 1 indicates that the input digital image 210 contains only one type of reference feature, and that the input digital image 210 has a limited amount of information. Therefore, a large Gini coefficient indicates that the input digital image 210 is a low-content digital image 250, while the small Gini coefficient indicates that the input digital image 210 is a rich-content digital image 270.

Rich-content digital images 270 are more likely to be cluttered images than low-content digital images 250. Different methods for estimating clutter are used for the low-content digital images 250 and the rich-content digital images 270. The low-content digital images 250 are further analyzed by a determine low-content clutter score step 260 to determine the clutter score 290; and the rich-content digital images 270 are further analyzed by a determine rich-content clutter score step 280 to determine the clutter score 290. Additional details of an exemplary embodiment of the determine rich-content clutter score step 280 will be described in FIG. 4; and additional details of an exemplary embodiment of the determine low-content clutter score step 260 will be described in FIG. 9.

Figure 3:
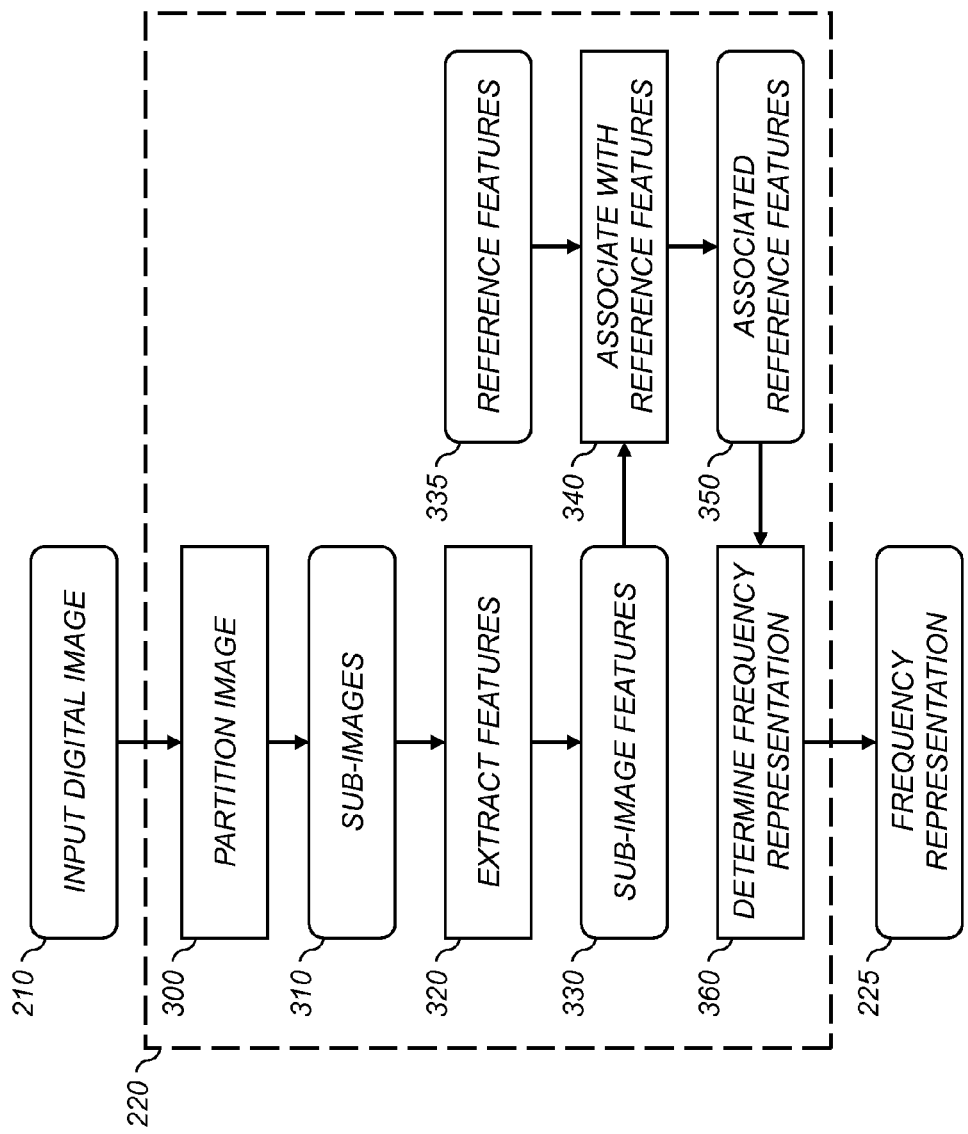
FIG. 3 is a flowchart showing a detailed view of the form frequency representation step of FIG. 2.

FIG. 3 is a flowchart showing additional details of the form frequency representation step 220 in FIG. 2 according to an exemplary embodiment. First, a partition image step 300 is used to divide the input image 210 into a set of small sub-images 310. Preferably, before partitioning the input digital image 210, it should be resized to a predefined size (e.g., 512×384 pixels). This ensures that all of the images are evaluated at the same scale and serves to normalize the frequency representation 225. In a preferred embodiment, the partition image step 300 partitions the input digital image 210 into 16×16 pixel blocks. For a scaled image size of 512×384 pixels, this provides a total of 32×24=768 sub-images 310.

Next, an extract features step 320 is used to analyze each of the sub-images 310 to extract a corresponding set of sub-image features 330. The sub-image features 330 are local image features that characterize various attributes of the sub-images 310. In a preferred embodiment, the sub-image features 330 include both texture features and color features.

Any type of texture feature known in the art can be used for sub-image features 330, such as the well-known Histogram of Oriented Gradients (HOG) features described by Dalal et al. in the article "Histograms of oriented gradients for human detection" (IEEE Computer Society Conference on Computer Vision and Pattern Recognition, Vol. 1, pp. 886-893, 2005), which is incorporated herein by reference. The HOG features are determined by counting the occurrences of gradient directions (i.e., edge orientations) for the pixels within a sub-image 310.

In some embodiments, wavelet transforms can be applied to the sub-image 310, and some or all of the resulting wavelet coefficients can be used as sub-image features 330. Methods for performing wavelet transforms are well-known in the image processing art. Other types of image transforms such as discrete cosine transforms (DCT) can also be used to determine the sub-image features.

Any type of color feature known in the art can also be used for sub-image features 330. In some embodiments, the color features can include simple color statistics determined by analyzing the colors of the images pixels in the sub-image 310. For example, the average and standard deviations of the red, green and blue code values can be determined and used as image features. In some cases, the image pixels can be transformed to a different color space (e.g., CIELAB or $YC_rC_b$) before determining the color statistics.

In some embodiments, the color features can include color histograms that provide an indication of the relative number of image pixels in the sub-image 310 that occur within pre-defined ranges of color values. In some embodiments, the color histograms can be determined using the method described by Pass et al. in the article entitled "Comparing images using color coherence vectors" ('Proc. Fourth ACM International Conference on Multimedia, pp. 65-73, 1996), which is incorporated herein by reference. This article also describes the formation of Color Coherence Vectors (CCVs) which incorporate spatial information together with color information. These CCVs can be used in the present invention as a generalization of a color histogram.

An associate with reference features step 340 is used to associate each of the sub-image features 330 with one of a predefined set of reference features 335. In a preferred embodiment, a distance metric is determined between the sub-image feature 330 and each of the reference features 335, and the reference feature with the smallest distance metric is designated to be an associated reference feature 350. In a preferred embodiment, the sub-image features 330 and the reference features 335 are represented as vectors, and the distance metric is the Euclidean distance between the corresponding vectors.

Any appropriate method can be used to define the set of reference features 335. In a preferred embodiment, the set of reference feature set is created by:

1. Randomly collecting a large number of sub-images from a population of typical digital images;
2. Extracting sub-image features from the collection of sub-images;
3. Forming sub-image feature clusters by using well-known K-means algorithm to form groups of similar sub-image features;
4. Designating the sub-image features closest to the centroid of the sub-image feature clusters to be the reference features 335.

Finally, a determine frequency representation step 360 is used to determine a frequency representation 225 responsive to the associated reference features 350. In a preferred embodiment, the frequency representation 225 is a histogram formed by counting the number of sub-image features 330 that are associated to each of the reference features 335.

The number of reference features 335 should generally be selected so that the frequency representation 225 determined for most input digital images 210 will have at least some bins having a count larger than one indicating that multiple sub-image features 330 are mapped to the same associated reference feature 350. It has been found that good results can be obtained when about 400 reference features 335 are used (e.g., 200 texture features and 200 color features). In other embodiments, smaller or larger sets of reference features 335 can be used (e.g., between 50 and 1000 reference features 335).

Figure 4:
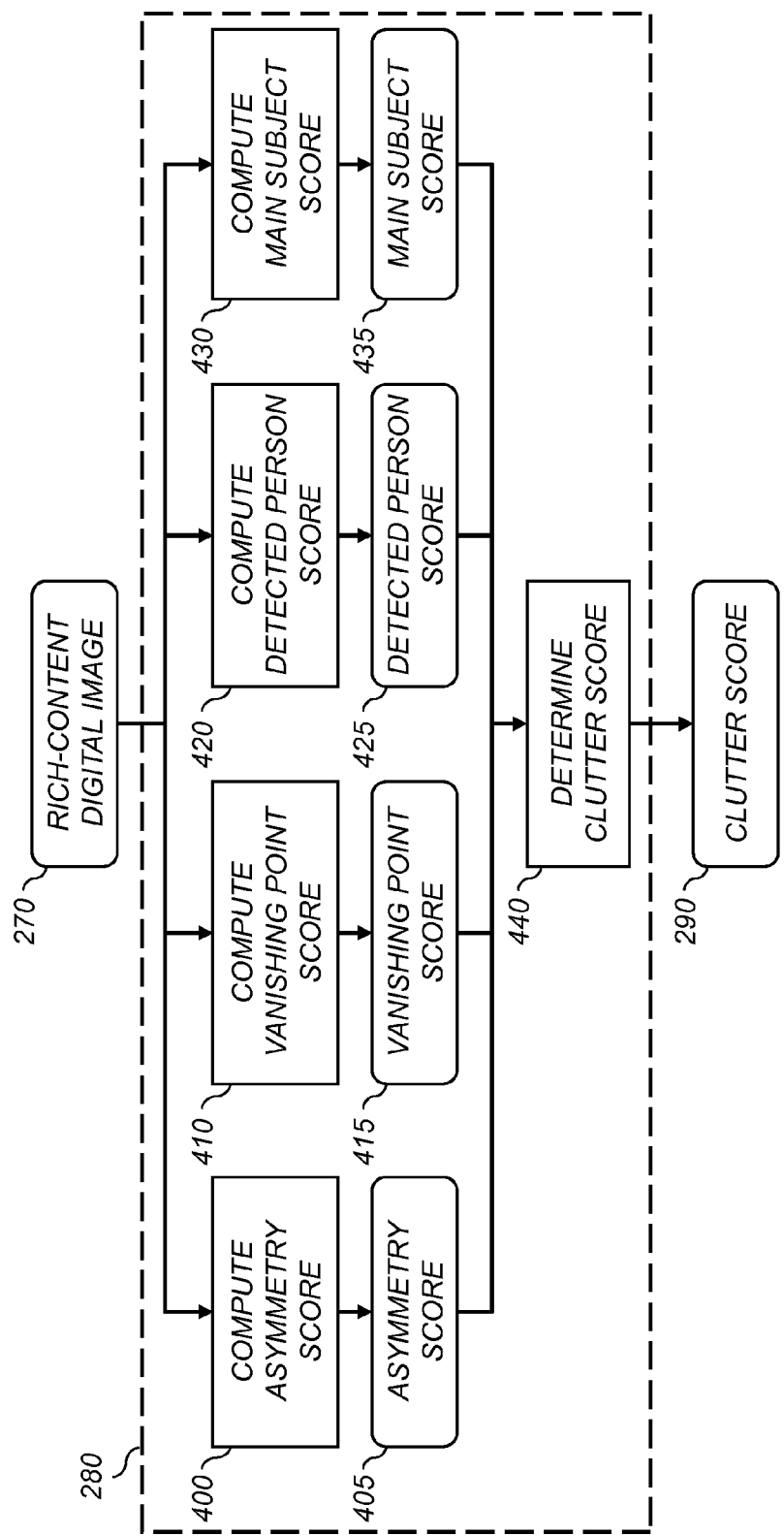
FIG. 4 is a flowchart showing a detailed view of the compute rich-content clutter score step of FIG. 2.

FIG. 4 is a flowchart showing additional details of the determine rich-content clutter score step 280 in FIG. 2 according to an exemplary embodiment. The determine rich-content clutter score step 280 further analyzes the scene content of the rich-content digital image 270 in order to characterize the composition of the image and determine an appropriate clutter score 290. As discussed earlier, the rich-content digital image 270 has been determined to include a large amount of image information, and therefore has the potential to have a high level of image clutter.

A study by Cerosaletti et al. which is described in the article "Investigating two features of aesthetic perception in consumer photographic images: clutter and center" (Proc. SPIE 7865, Human Vision and Electronic Imaging XVI, 786507, 2011), shows that image clutter and artistic quality are strongly correlated. Commonly-assigned U.S. Patent Application Publication 2011/0075917 to Cerosaletti, et al., entitled "Estimating aesthetic quality of digital images," which is incorporated herein by reference, describes a method for estimating the aesthetic quality of a digital image responsive to various image features. This basic approach is also described a related article by Jiang et al., entitled "Automatic aesthetic value assessment in photographic images" (Proc. International Conference on Multimedia and Expo, pp. 920-925, 2010). According to a preferred embodiment, the determine rich-content clutter score step 280 determines the clutter score 290 based on a similar set of image features.

In the exemplary embodiment of FIG. 4, the determine rich-content clutter score step 280 determines the clutter score 290 responsive to four image features related to various aspects of scene content information: an asymmetry score 405 determined by a compute asymmetry score step 400; a vanishing point score 415 determined by a compute vanishing point score step 410; a detected person score 425 determined by a compute detected person score step 420; and a main subject score 435 determined by a compute main subject score step 430. Additional details regarding the computation of these image feature scores will be discussed below. In other embodiments, different sets of image features can be determined and used to determine the clutter score 290. The different sets of image features can include more features or fewer features than those shown in FIG. 4, or can include variations of the particular features that are described herein.

A determine clutter score step 440 is used to combine the different image feature scores to determine the clutter score 290. The image feature scores can be combined in any appropriate manner. In a preferred embodiment, the determine clutter score step 440 combines the image feature scores by forming a weighted linear combination of the individual image feature scores according to the following equation:

$$C_T = \sum_i W_i C_i \quad (3)$$

where $C_T$ is the clutter score 290, $C_i$ is the image feature score computed for the $i^{th}$ image feature, and $W_i$ is a weighting coefficient for the $i^{th}$ image feature. Preferably, each of the image feature scores are scaled to the same nominal range (e.g., 0-100) so that the weighting coefficients indicate the relative importance of the image features in the prediction of the clutter score. If the weighting coefficients sum to 1.0, then the clutter score 290 will also have the same nominal range as the individual image features scores.

In a preferred embodiment, the weighting coefficients are determined based on the prediction accuracy for a training set of images. In some cases, the individual image feature scores are each computed using least-squares models that are determined by fitting a set of training data. In this case, the weighting coefficients can be determined as:

$$W_i = \frac{1/\sigma_i^2}{\sum_i 1/\sigma_i^2} \quad (4)$$

where $\sigma_i$ is the RMS model error for the $i^{th}$ image feature.

Figure 5:
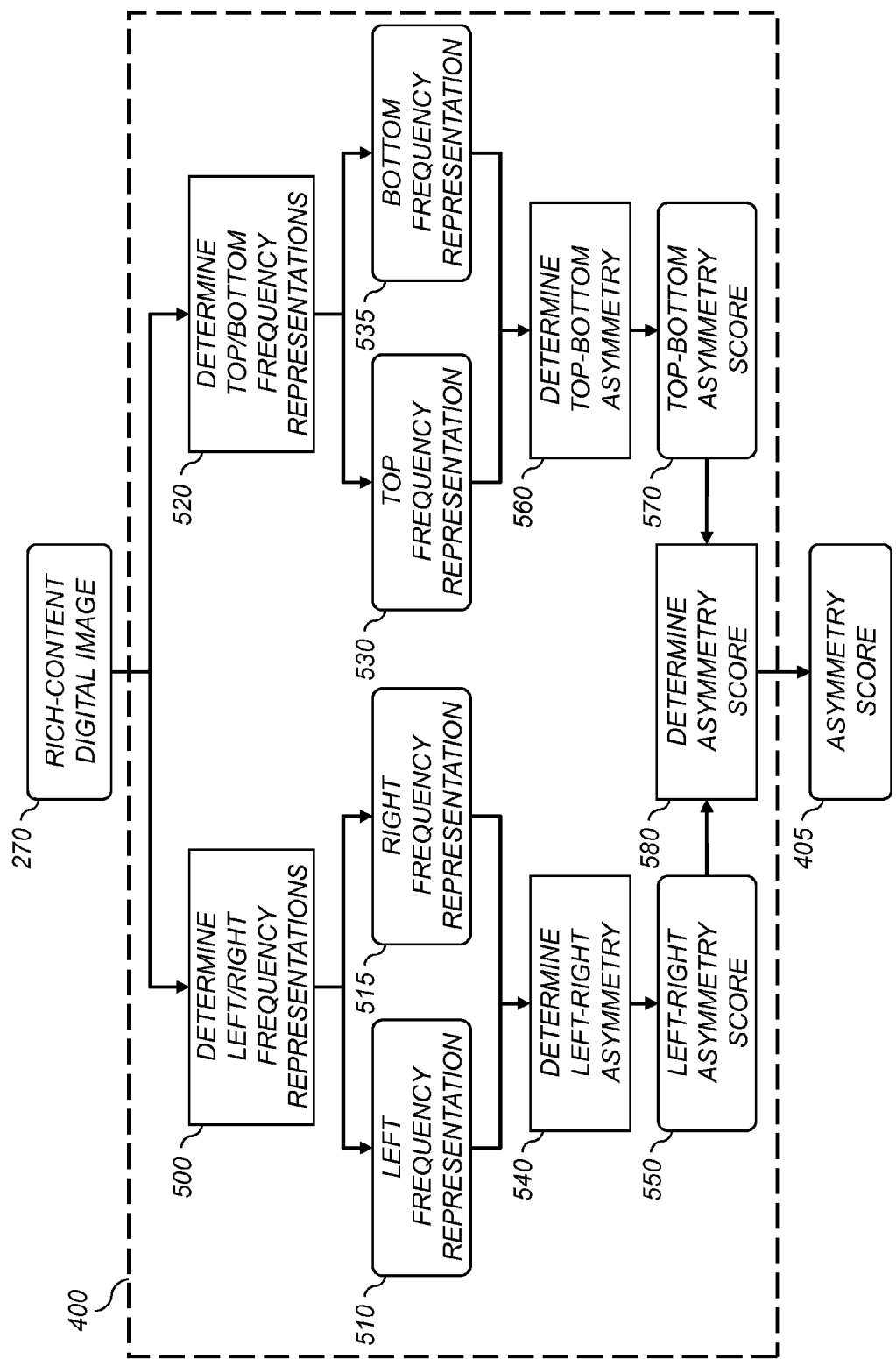
FIG. 5 is a flowchart showing a detailed view of the compute asymmetry score step of FIG. 4.

FIG. 5 is a flowchart showing additional details of the compute asymmetry score step 400 of FIG. 4 according to an exemplary embodiment. A determine left/right frequency representations step 500 divides the rich-content digital image 270 in a width direction into two approximately equal halves (a left-half image and a right-half image), and determines corresponding frequency representations for each half using the same method that was described above with respect to FIG. 3. Accordingly, a left frequency representation 510 is determined for the left-half image and a right frequency representation 515 is determined for the right-half image.

A determine left-right asymmetry 540 is used to determine a left-right asymmetry score 550 responsive to a difference between the left frequency representation 510 and the right frequency distribution 515. In a preferred embodiment, the left frequency representation 510 and the right frequency distribution 515 are represented as vectors, and the left-right asymmetry score 550 is the Euclidean distance between the corresponding vectors. In this case, lower values of the left-right asymmetry score 500 will correspond to more symmetry. In other embodiments, the left-right asymmetry score 550 can be determined by computing an overlap score between the left frequency representation 510 and the right frequency distribution 515. In this case, higher values of the left-right asymmetry score 500 will correspond to more symmetry.

Similarly, a determine top/bottom frequency representations step 520 divides the rich-content digital image 270 in a height direction into two approximately equal halves (a top-half image and a bottom-half image), and determines a top frequency representation 530 and a bottom frequency representation 535 in an analogous manner. A determine top-bottom asymmetry 560 is then used to determine a top-bottom asymmetry score 570 responsive to a difference between the top frequency representation 530 and the bottom frequency distribution 535.

A determine asymmetry score step 580 combines the left-right asymmetry score 550 and the top-bottom asymmetry score 570 to determine the asymmetry score 405. The left-right asymmetry score 550 and the top-bottom asymmetry score 570 can be combined in any appropriate manner. In a preferred embodiment left-right asymmetry score 550 and the top-bottom asymmetry score 570 are added together to form a total asymmetry score.

In some embodiments, the total asymmetry score can be used directly as the asymmetry score 405. In other embodiments, an asymmetry score function can be defined that relates the total asymmetry score to the asymmetry score 405 based on user responses to clutter determined for a set of training images. The asymmetry score function can be a simple linear function, or in some embodiments can be a nonlinear function. In general, images having a higher asymmetry score 405 will have a higher degree of perceived clutter. Conversely, images having a lower asymmetry score 405 will have a lower degree of perceived clutter.

In an exemplary embodiment, the asymmetry score function is given by the linear function:

$$C_1 = m_1 A_T = m_1 [|H_L - H_R| + |H_T - H_B|] \quad (5)$$

where $A_T$ is the total asymmetry score, $|H_L - H_R|$ is the Euclidean distance between the left frequency representation 510 ($H_L$) and the right frequency representation 515 ($H_R$), $|H_T - H_B|$ is the Euclidean distance between the top frequency representation 530 ($H_T$) and the bottom frequency representation 535 ($H_B$), and $m_1$ is a scaling constant which is determined by fitting the clutter scores for the set of training images.

Figure 6:
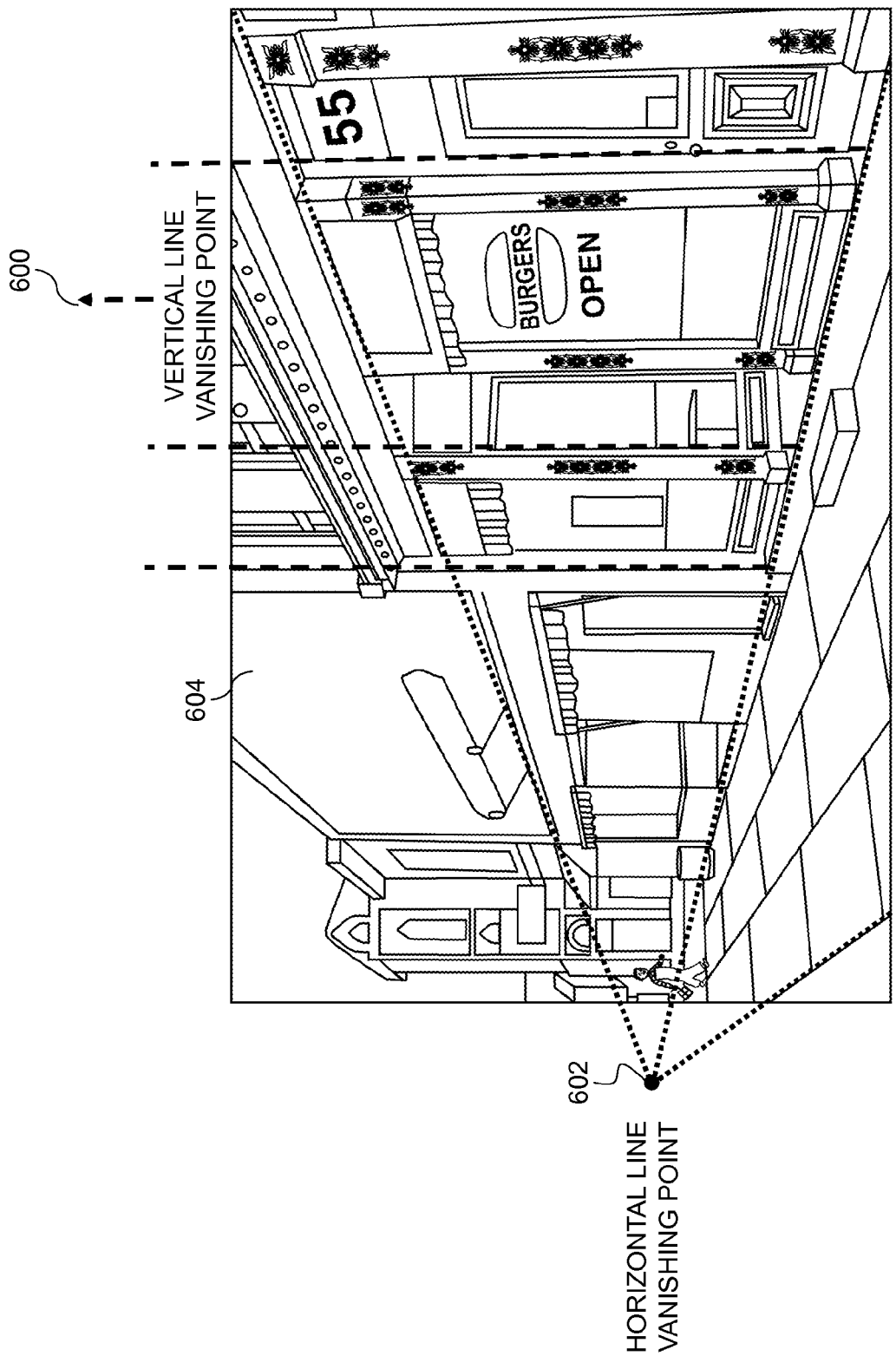
FIG. 6 is a diagram illustrating horizontal and vertical line vanishing points.

Returning to a discussion of FIG. 4, the compute vanishing point score step 410 detects the presence of vanishing points in the rich-content digital image 270, and determines the vanishing point score 415 responsive to the detected vanishing points. In a preferred embodiment, the vanishing points are detected using the method disclosed in commonly-assigned U.S. Pat. No. 6,778,699 to Gallagher entitled "Method of determining vanishing point location from an image," which is incorporated herein by reference. This method includes detecting line segments in the image; computing intersections from pairs of line segments; determining a local maximum corresponding to a plurality of probabilities; and outputting an estimated vanishing point vector VE that corresponds to the determined local maximum, such that an estimated vanishing point location about the estimated vanishing point vector VE is determined. FIG. 6 shows an illustration of a vertical line vanishing point 600 and a horizontal line vanishing point 602 determined by intersecting line segments detected in an exemplary digital image 604 in this manner. A strength value can be determined for each detected vanishing point relating to the number and length of intersecting line segments. In some embodiments, the strength value is determined by summing the lengths of each intersecting line segment.

In a preferred embodiment, the vanishing point score 415 is determined responsive to the strength and number of strong vanishing points that are detected (i.e., the number of vanishing points having a corresponding strength that exceeds a predefined threshold). In some embodiments, the number of strong vanishing points can be used directly as the vanishing point score 415. In other embodiments, a vanishing point score function can be defined that relates the number of strong vanishing points to the vanishing point score 415 based on user responses to clutter determined for a set of training images. The vanishing point score function can be a simple linear function, or in some embodiments can be a nonlinear function.

In general, images having more and stronger vanishing points will have a lower degree of perceived clutter. Conversely, images having fewer and weaker vanishing points will have a lower degree of perceived clutter. In an exemplary embodiment, the vanishing point score function is given by the linear function:

$$C_2 = m_2 N_v + b_2 \quad (6)$$

where $N_v$ is the number of strong vanishing points, and $m_2$ and $b_2$ are fitting constants which are determined by fitting the clutter scores for the set of training images.

In some embodiments, the vanishing point score 415 can also be determined responsive to the positions or strengths of the detected vanishing points, or combinations thereof. For example, the vanishing point score function can incorporate the strengths of the vanishing points as follows:

$$C_2 = m_2 \left( \sum_{j=1}^{N_v} V_j \right) + b_2 \quad (7)$$

where $V_j$ is the strength value for the $j^{th}$ strong vanishing point.

Figure 7:
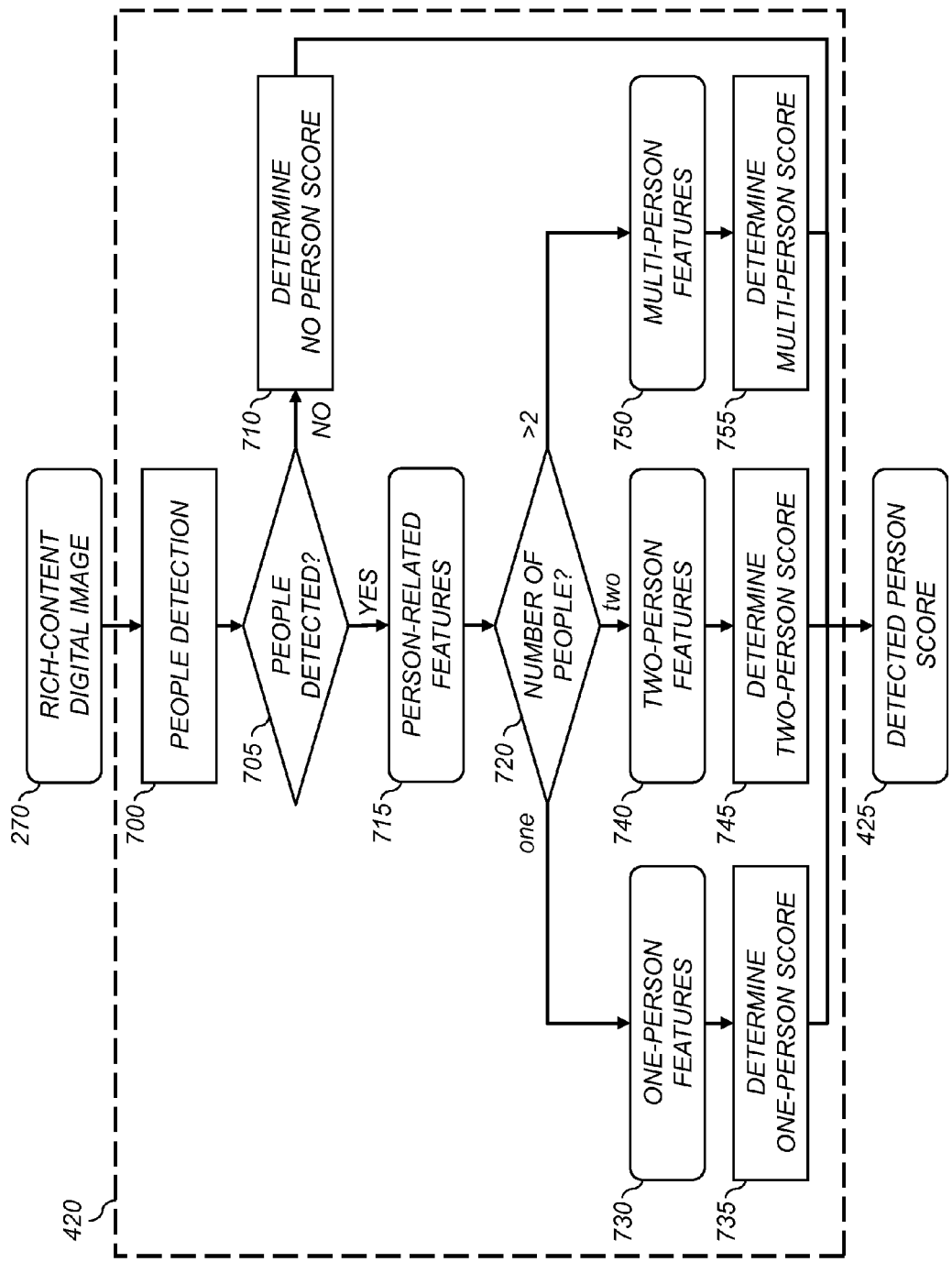
FIG. 7 is a flowchart showing a detailed view of the compute detected person score step of FIG. 4.

FIG. 7 is a flowchart showing additional details of the compute detected person score step 420 of FIG. 4 according to an exemplary embodiment. A people detection step 700 is used to analyze the rich-content digital image 270 to detect the presence of any people that are depicted in the rich-content digital image 270. Generally, images that contain fewer faces that are larger and closer to the center of the image will have a lower perceived clutter level. In a preferred embodiment, the people detection step 700 detects people using a face detection algorithm adapted to detect human faces. Methods for detecting human faces are well known in the art of computer vision. In some embodiments, faces can be detected using the method described in the aforementioned U.S. Patent Application Publication 2011/0075917 to Cerosaletti, et al., entitled "Estimating aesthetic quality of digital images."

A people detected test 705 evaluates the results provided by the people detection step 700 to determine if any people were detected in the rich-content digital image 270. If no people were detected a determine no person score step 710 is used to set the detected person score 425 to an appropriate value. In a preferred embodiment, the detected person score 425 assigned when no persons are detected is determined by determining user responses to clutter for a set of training images having different numbers of people. The average response for the training images that have no people can then be used to define the detected person score 425 assigned by the determine no person score step 710.

In the case where the people detected test 705 determines that people were detected in an image, person-related features 715 are extracted, from which the detected person score 425 will be determined. In a preferred embodiment, the person-related features 715 include the location and size of the faces of the detected persons. In an exemplary embodiment, the location of the face is characterized by the pixel coordinates of the centroid of the detected face region normalized by the corresponding image width and height, and the size of a face is characterized by the number of pixels in the detected face region normalized by the total number of pixels in the rich-content digital image 270. In some embodiments, the person-related features 715 can include information indicating the identity of the detected persons.

In some embodiments, the detected person score 425 is determined from the person-related features 715 by using a pre-trained machine learning model. Examples of appropriate machine learning models include, but are not limited to, artificial neural networks, sparse representations, regression trees, Bayesian networks, support vector machines, and various combinations thereof. These types of machine learning algorithms are well-known to those skilled in the computer vision art. In other embodiments, other types of models, such as regression models, can be used to determine the detected person score 425 from the person-related features 715. In a preferred embodiment, the detected person score 425 is determined from the person-related features 715 by using one or more pre-trained artificial neural network models. The artificial neural network models have input nodes corresponding to a set of features related to the detected persons, and an output node corresponding to the detected person score 425. In some exemplary embodiments, the artificial neural network models have one hidden layer with 5 to 10 nodes. The artificial neural network models are trained to predict the perceived clutter using a set of training images that have been evaluated by a set of observers to determine a perceived clutter response. Methods for defining and training artificial neural network models are well-known to those skilled in the art, and any such method can be used in accordance with the present invention.

In some embodiments, different artificial neural network models are trained for different numbers of detected people, and a number of people test 720 is used to direct the method to use the appropriate artificial neural network model. For the case where one person is detected, a determine one person score step 735 is used to determine the detected person score 425, preferably using a pre-trained artificial neural network model having input nodes corresponding to a set of one person features 730 and an output node corresponding to the detected person score 425. In a preferred embodiment, the one person features 730 are the size and location of the detected face for the detected person.

For the case where two people are detected, a determine two-person score step 745 is used to determine the detected person score 425 using a pre-trained artificial neural network model having input nodes corresponding to a set of two-person features 740 and an output node corresponding to the detected person score 425. In a preferred embodiment, the two-person features 740 are the size and location of the detected face for both detected persons.

For the case where more than two people are detected, a determine multi-person score step 755 is used to determine the detected person score 425 using a pre-trained artificial neural network model having input nodes corresponding to a set of multi-person features 750 and an output node corresponding to the detected person score 425. In a preferred embodiment, the multi-person features 750 include a number of detected faces, an average of the detected face locations, a standard deviation of the detected face locations, an average size of the detected faces, and maximum and minimum sizes of the detected faces.

Figure 8:
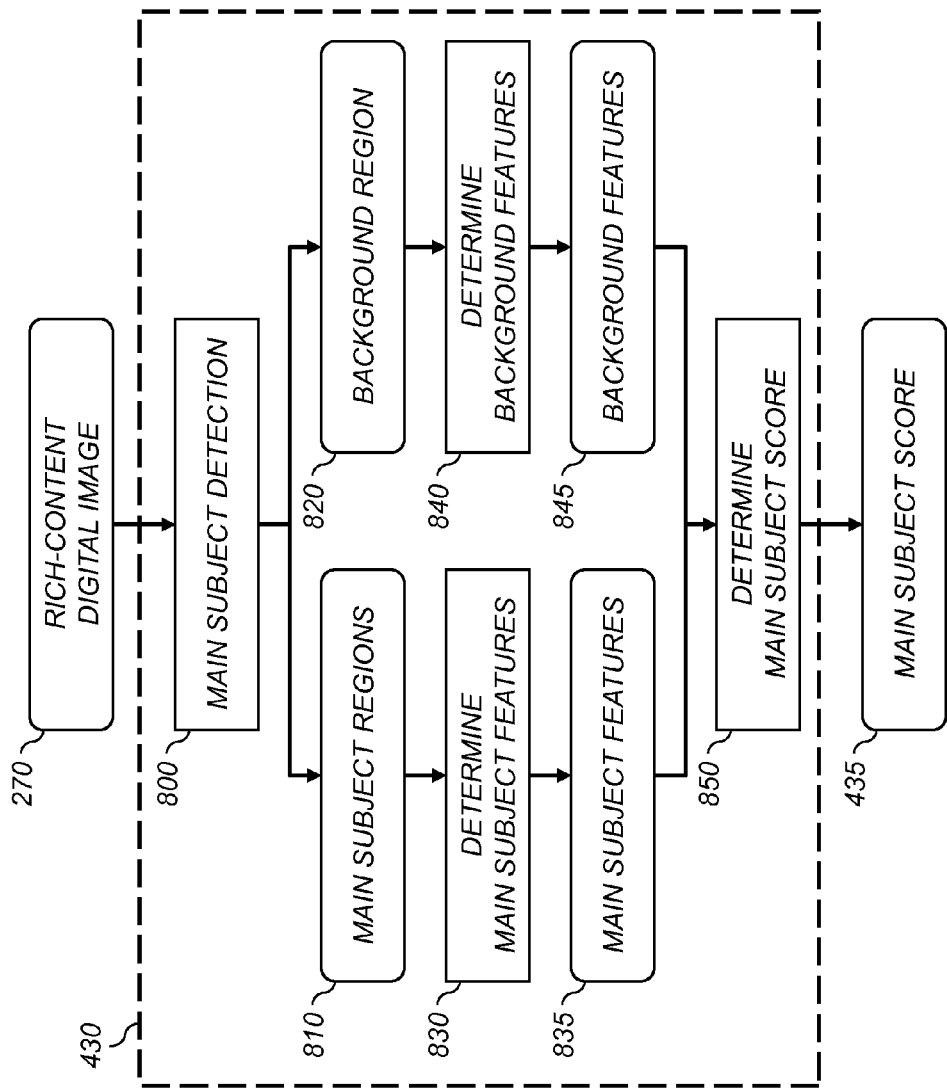
FIG. 8 is a flowchart showing a detailed view of the compute main subject score step of FIG. 4.

FIG. 8 is a flowchart showing additional details of the compute main subject score step 430 of FIG. 4 according to an exemplary embodiment. A main subject detection step 800 is used to automatically analyze the rich-content digital image 270 to determine one or more main subject regions 810. Generally, images that contain fewer main subjects that are larger and closer to the center of the image will have a lower perceived clutter level. Preferably, the main subject regions 810 are determined using a main subject detection algorithm, such as that disclosed in commonly-assigned U.S. Pat. No. 6,282,317 to Luo et al. entitled "Method for automatic determination of main subjects in consumer images," which is incorporated herein, is applied to the rich-content digital image 270. The algorithm extracts regions of arbitrary shape and size for a set of detected objects corresponding to main subjects. The rest of the rich-content digital image 270 is considered to be a background region 820.

A determine main subject features step 830 is used to determine a set of main subject features 835 corresponding to the main subject regions 810, and a determine background features step 840 is used to determine a set of background features 845 corresponding to the background region 820. In a preferred embodiment, the features determined for a particular image region include a brightness feature, a contrast feature, an edge distribution feature, a color histogram feature and an inequality index feature. In some embodiments, the main subject features 835 can also include other types of features such as a spatial location feature, a size feature or a subject type feature, or combinations thereof.

The determination of the brightness and contrast features is preferably performed on a luminance channel of the rich-content digital image 270. In some embodiments, the brightness feature is determined by computing a mean of the luminance values for the image pixels in the image region, and the contrast feature is determined by computing a standard deviation of the luminance values for the image pixels in the image region.

In some embodiments, the edge distribution feature can be determined by computing an absolute difference between the luminance values for adjacent pixels in the image region. The resulting absolute differences can then be binned and normalized to form an edge value histogram (e.g., containing 20 bins). which is used as the edge distribution feature.

In some embodiments, the color histogram feature is created by quantizing red, green and blue pixel values of the image pixels in the image region into 5 bins, and then accumulating the quantizing values into a color histogram having $5^3=125$ color bins. The color histogram is preferably normalized by the total number of pixels in the region.

In some embodiments, the inequality index feature for the image region is computed using same method that was described relative to the determination of the inequality index 235 in FIG. 2. This method involves determining a frequency representation for a set of reference features, then computing a measure of statistical variation such as the entropy or the Gini coefficient.

A determine main subject score step 850 determines the main subject score 435 responsive to the main subject features 835 and the background features 845. In a preferred embodiment, the determine main subject score step 850 determines the main subject score 435 using a pre-trained artificial neural network model which has input nodes corresponding to the main subject features 835 and the background features 845, and has an output node corresponding to the main subject score 435. In some exemplary embodiments, the artificial neural network models have one hidden layer with 5 to 10 nodes. The artificial neural network model can be trained using a set of training images that have been evaluated by a set of observers to determine a perceived clutter response. In other embodiments, the determine main subject score step 850 can determine the main subject score 435 using a different type of model, such as a regression model or a different type of machine learning model.

Figure 9:
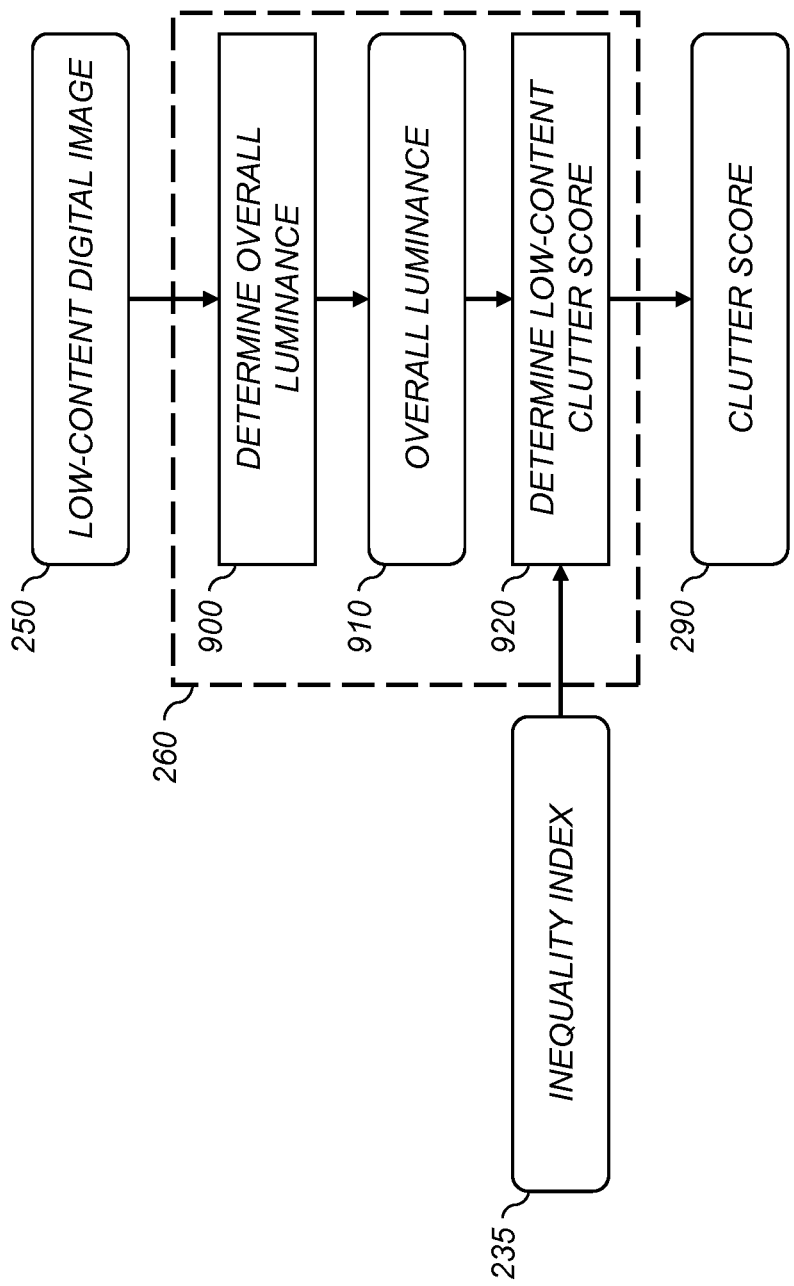
FIG. 9 is a flowchart showing a detailed view of the compute low-content clutter score step of FIG. 2.

Returning to a discussion of FIG. 2, the low-content digital image 250 will generally be considered by an observer to be non-cluttered images in most cases, except that it has been found that some dark images can contain cluttered objects that are hidden in the darkness. The hidden cluttered object can be missed by the algorithm for determining the inequality index 235, but can be easily picked up by a human observer. FIG. 9 is a flowchart showing additional details for an exemplary embodiment of the determine low-content clutter score step 260 of FIG. 2 which is designed to handle this exception. A determine overall luminance step 900 is used to determine an overall luminance 910 of the low-content digital image 250. In a preferred embodiment, the overall luminance 910 is computed by averaging luminance values for the image pixels in the low-content digital image 250.

A determine low-content clutter score step 920 is then used to determine the clutter score 290 responsive to the overall luminance 910 and the inequality index 235. In a preferred embodiment, the clutter score 290 can be calculated by a linear regression model:

$$C_T = m_E E + m_I I + b_T \tag{8}$$

where $C_T$ is the clutter score 290, E is the inequality index 235, I is the overall luminance 910 of the image, and $m_E$, $m_I$ and $b_T$ are fitting coefficients determined by fitting data for a set of training images that have been evaluated by a set of observers to determine a perceived clutter response. It will be obvious to one skilled in the art that the determine low-content clutter score step 920 can alternately use other types of mathematical models for predicting the clutter score 290 for low-content digital images 250. Such models can involve analyzing the low-content digital images 250 to extract various features that may be useful to provide an indication of the perceived clutter.

Figure 10:
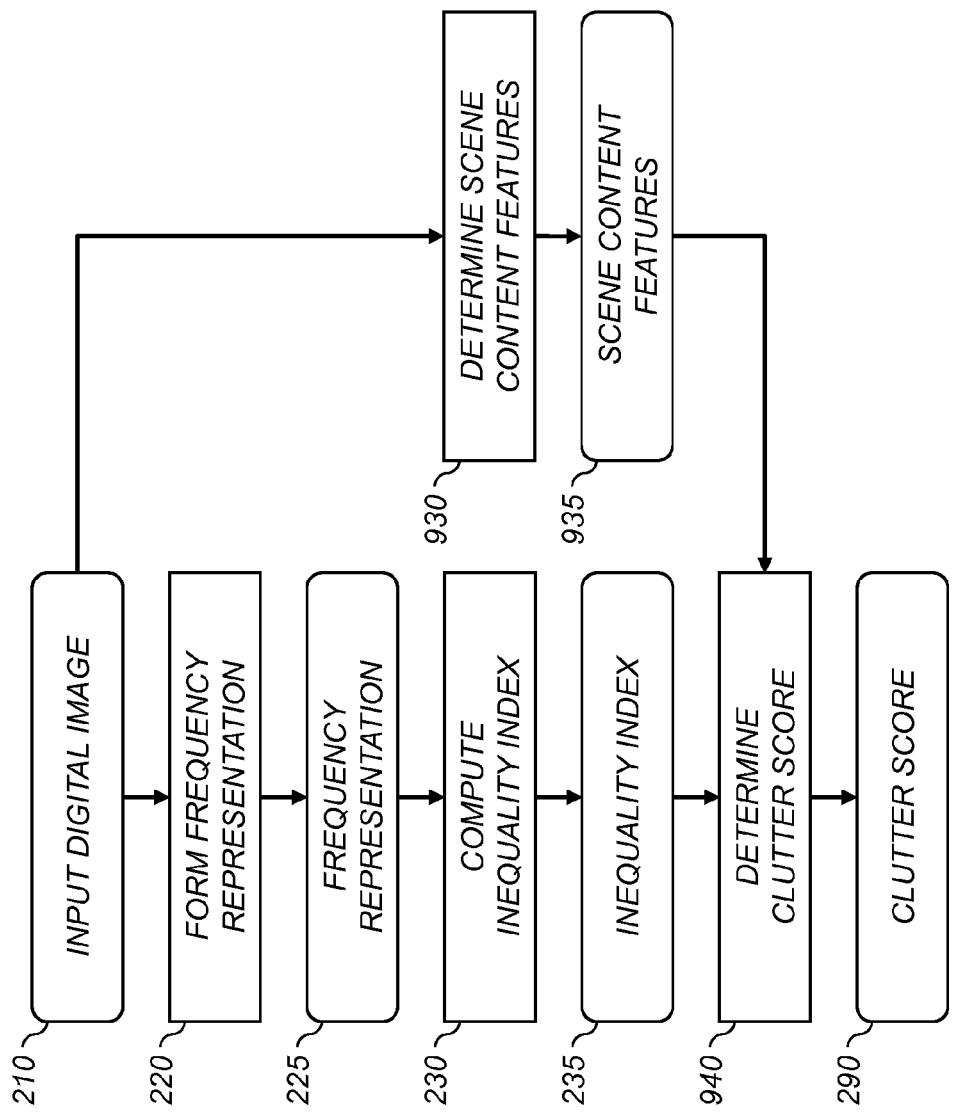
FIG. 10 is a flowchart of a method for estimating image clutter according to an alternate embodiment.

The method described with reference to FIG. 2 used two different methods to determine the clutter score for low-content digital images 250 and high-content digital images 270. In other embodiments, the same analysis method can be used for all values of the inequality index 235. One such exemplary method is shown in FIG. 10. This method includes determining the input digital image 210 to determine the inequality index 235 using the same process that was described with reference to FIG. 2. This inequality index 235 is used as an input to a determine clutter score step 940, together with a set of scene content features 935 relating to spatial structures in the input digital image 210 or semantic content of the input digital image 210, to determine the clutter score 290.

The scene content features 935 are determined by analyzing the input digital image 210 using a determine scene content features step 930. In some embodiments, the scene content features 935 include some or all of the asymmetry score 405, the vanishing point score 415, the detected person score 425 and the main subject score 435 that were described earlier with reference to FIGS. 4-8. The scene content features 935 can also include low-level features such as the brightness features, contrast features, edge distribution features, and color histogram features that were described earlier.

In some embodiments, the determine clutter score step 940 determines the clutter score 290 using a pre-trained artificial neural network model where the inequality index 235 and the scene content features 935 are used as the input nodes, and the clutter score 290 is the output node. In some exemplary embodiments, the artificial neural network models have one hidden layer with 15-20 nodes. It will be recognized that in various embodiments the determine clutter score step 940 can alternatively use another type of model, such as such as a regression model or a different type of machine learning model, or a combination thereof.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
210 input digital image
220 form frequency representation step
225 frequency representation
230 compute inequality index step
235 inequality index
240 inequality index test
250 low-content digital image
260 determine low-content clutter score step
270 rich-content digital image
280 determine rich-content clutter score step
290 clutter score
300 partition image step
310 sub-images
320 extract features step
330 sub-image features
335 reference features
340 associate with reference features step
350 associated reference features
360 determine frequency representation step
400 compute asymmetry score step
405 asymmetry score
410 compute vanishing point score step
415 vanishing point score
420 compute detected person score step
425 detected person score
430 compute main subject score step
435 main subject score
440 determine clutter score step
500 determine left/right frequency representations step
510 left frequency representation
515 right frequency representation
520 determine top/bottom frequency representations step
530 top frequency representation
535 bottom frequency representation
540 determine left-right asymmetry step
550 left-right asymmetry score
560 determine top-bottom asymmetry step
570 top-bottom asymmetry score
580 determine asymmetry score step
600 vertical line vanishing point
602 horizontal line vanishing point
604 digital image
700 people detection step
705 people detected test
710 determine no person score step
715 person-related features
720 number of people test
730 one-person features
735 determine one-person score step
740 two-person features
745 determine two-person score step
750 multi-person features
755 determine multi-person score step
800 main subject detection step
810 main subject regions
820 background region
830 determine main subject features step
835 main subject features
840 determine background features step
845 background features
850 determine main subject score step
900 determine overall luminance step
910 overall luminance
920 determine low-content clutter score step
930 determine scene content features step
935 scene content features
940 determine clutter score step

The invention claimed is:

1. A method for determining an estimated clutter level of an input digital image, the method being performed at least in part using a data processor, comprising:

designating a set of reference features;
partitioning the input digital image into small sub-images;
determining a set of image features by automatically analyzing the sub-images;
associating each of the determined image features with one of the reference features;
forming a frequency distribution representing a frequency of occurrence of the associated reference features for the input digital image;
analyzing the frequency distribution to determine an inequality index, the inequality index being a measure of statistical variation of the reference features;

comparing the inequality index to a predefined threshold to classify the input digital image as a rich-content image or a low-content image;
if the input digital image is classified as a rich-content image:
analyzing the input digital image to automatically determine scene content features relating to spatial structures in the input digital image or semantic content of the input digital image; and
determining the estimated clutter level responsive to the scene content features; and
if the input digital image is classified as a low-content image:
analyzing the input digital image to automatically determine an overall luminance level; and
determining the estimated clutter level responsive to the determined overall luminance level.

2. The method of claim 1 wherein the inequality index is an entropy value.

3. The method of claim 2 wherein the entropy value is determined according to the equation:

$$E = -\sum_k p_k \log(p_k)$$

where E is the entropy value, $p_k$ is a probability of occurrence of the $k^{th}$ reference feature, and log(•) is a logarithm function.

4. The method of claim 1 wherein the inequality index is a Gini coefficient.

5. The method of claim 4 wherein the Gini coefficient is determined according to the equation:

$$G = \sum_k (p_k)^2$$

where G is the Gini coefficient, and $p_k$ is a probability of occurrence of the $k^{th}$ reference feature.

6. The method of claim 1 wherein the scene content features relating to spatial structures in the input digital image includes a scene asymmetry score providing an indication of a degree of asymmetry of scene content in the input digital image.

7. The method of claim 1 wherein the scene content features relating to spatial structures in the input digital image includes a vanishing point score determined responsive to detecting vanishing points in the input digital image.

8. The method of claim 1 wherein the scene content features relating to semantic content of the input digital image includes a depicted person score determined responsive to depicted person features relating to one or more persons depicted in the input digital image.

9. The method of claim 8 wherein the depicted person features for a depicted person includes a face location, a face size or an identity of the depicted person.

10. The method of claim 1 wherein the scene content features relating to semantic content of the input digital image includes a main subject score determined responsive to one or more main subject features relating to one or more main subjects depicted in the input digital image.

11. The method of claim 10 wherein the main subject features for a main subject include a brightness feature, a contrast feature, an edge distribution feature, a color histogram feature and an inequality index feature, a spatial location feature, a size feature or a subject type feature.

12. The method of claim 1 wherein the reference features and the determined image features are characterized by a set of feature attributes.

13. The method of claim 12 wherein the feature attributes include texture attributes and color attributes.

14. The method of claim 1 wherein a particular image feature is associated with a particular reference feature by:
determining a distance metric between the particular image feature and each of the reference features, and
designating the reference feature having the smallest distance metric to be the associated reference feature.

* * * * *